United States Patent
Minagawa et al.

(10) Patent No.: US 9,342,152 B2
(45) Date of Patent: May 17, 2016

(54) SIGNAL PROCESSING DEVICE AND SIGNAL PROCESSING METHOD

(71) Applicant: FUJITSU LIMITED, Kawasaki-shi, Kanagawa (JP)

(72) Inventors: Akihiro Minagawa, Tachikawa (JP); Yutaka Katsuyama, Yokohama (JP); Hiroaki Takebe, Kawasaki (JP); Yoshinobu Hotta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 14/206,340

(22) Filed: Mar. 12, 2014

(65) Prior Publication Data
US 2014/0285427 A1    Sep. 25, 2014

(30) Foreign Application Priority Data
Mar. 21, 2013 (JP) .................................. 2013-058552

(51) Int. Cl.
*G06F 3/0488* (2013.01)
*G06F 3/044* (2006.01)
*G06F 3/01* (2006.01)

(52) U.S. Cl.
CPC ..................................... *G06F 3/017* (2013.01)

(58) Field of Classification Search
CPC ... G06F 3/0488; G06F 3/044; G06F 3/04883; G06F 3/0412
See application file for complete search history.

(56) References Cited

U.S. PATENT DOCUMENTS

| | | | | |
|---|---|---|---|---|
| 4,835,680 A | * | 5/1989 | Hogg | G06K 9/6247 706/20 |
| 5,473,707 A | * | 12/1995 | Werth | G06K 9/68 382/160 |
| 6,873,610 B1 | * | 3/2005 | Noever | H04L 29/06 370/338 |
| 2007/0100666 A1 | * | 5/2007 | Stivoric et al. | 705/3 |
| 2008/0103997 A1 | * | 5/2008 | Fein | G06N 3/02 706/12 |
| 2012/0032893 A1 | * | 2/2012 | Calpe Maravilla | G06F 3/045 345/173 |
| 2012/0195495 A1 | * | 8/2012 | Shiell | G06K 9/00275 382/159 |
| 2013/0212049 A1 | * | 8/2013 | Maldonado | G06N 99/005 706/12 |
| 2013/0282388 A1 | * | 10/2013 | Engdegard | 704/500 |

(Continued)

FOREIGN PATENT DOCUMENTS

| | | |
|---|---|---|
| JP | 2003-80484 | 3/2003 |
| JP | 2009-514111 | 4/2009 |

(Continued)

OTHER PUBLICATIONS

Satoshi Matsuhashi, et al. "Human-face extraction using modified HSV color system and personal identification through facial image based on isodensity maps", Proc.Canadian Conference on Electrical and Computer Engineering, pp. 909-912, 1995. IEEE.

(Continued)

*Primary Examiner* — Ricardo L Osorio
(74) *Attorney, Agent, or Firm* — Staas & Halsey LLP

(57) ABSTRACT

A signal processing device includes: a memory; and a processor coupled to the memory and configured to: detect a second feature value relating to a first feature value recognized to satisfy a recognition condition, from a second time series prior to a first time series of the first feature value in a times series of a feature value corresponding to an input signal, and change the recognition condition so that the second feature value is recognized as a class for recognizing the first feature value.

19 Claims, 15 Drawing Sheets

(56) References Cited

U.S. PATENT DOCUMENTS

2013/0343729 A1* 12/2013 Rav-Acha et al. ............ 386/285
2014/0171053 A1* 6/2014 Stephens ....................... 455/418

FOREIGN PATENT DOCUMENTS

JP       2011-209773      10/2011
WO    WO 2007/053484    5/2007

OTHER PUBLICATIONS

R.M. Haralick et al. "Computer and robot vision", Addison-Wesley, pp. 28-48, 1992.
Ying-Hao Wang, et al. "Real-Time Image Processing of Human Face Identification for Home Service Robot", Proc. of IEEE/SICE Int. Symp.On System Integration, pp. 1171-1176, 2011.

* cited by examiner

FIG. 7
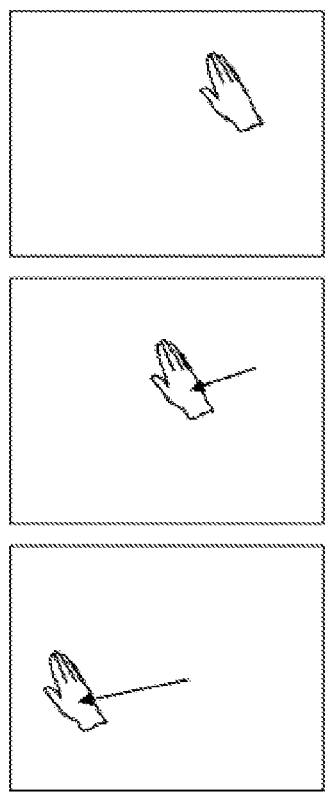
FRAME t-2
FRAME t-1
FRAME t
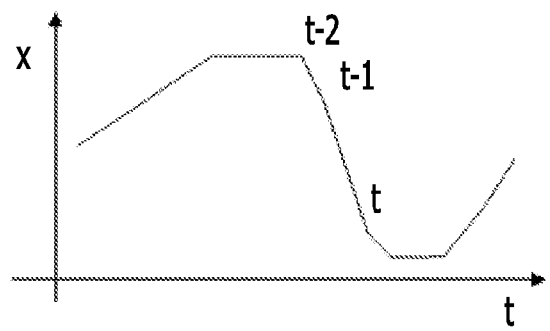

SIGNAL PROCESSING DEVICE AND SIGNAL PROCESSING METHOD

CROSS-REFERENCE TO RELATED APPLICATION

This application is based upon and claims the benefit of priority of the prior Japanese Patent Application No. 2013-058552, filed on Mar. 21, 2013, the entire contents of which are incorporated herein by reference.

FIELD

The embodiment discussed herein is related to a signal processing device and a signal processing method.

BACKGROUND

Conventionally, a signal processing device recognizes specific classes of input (for example, an operation, a motion, a command, and so on) from input signals, and performs processing suitable for the recognized classes of input. The signal processing device also recognizes a specific operation on a touch panel, for example, and performs processing for assigning the recognized operation to a certain class of input.

The signal processing devices learn the conditions of a signal to be recognized as each of the classes in advance. If a signal that meets one of the learned conditions of the classes is input, the signal processing devices perform a process corresponding to the class.

However, if an input signal is outside the condition to be recognized as a particular class, the signal processing devices do not recognize the signal as the class. For example, a gesture that the signal processing devices do not recognize because the gesture motion is slightly slower than that in the condition to be recognized (for example, a slow handwaving gesture) is not recognized until the signal condition is changed through learning, since the handwaving speed does not exceed a threshold value.

For example, if a new gesture motion is input a plurality of times, a command may be assigned to the gesture motion as a new gesture motion. Such a technique is described in, for example, Japanese Laid-open Patent Publication No. 2011-209773.

SUMMARY

According to an aspect of the invention, a signal processing device includes: a memory; and a processor coupled to the memory and configured to: detect a second feature value relating to a first feature value recognized to satisfy a recognition condition, from a second time series prior to a first time series of the first feature value in a times series of a feature value corresponding to an input signal, and change the recognition condition so that the second feature value is recognized as a class for recognizing the first feature value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates the motion of the hand and its transition;

DESCRIPTION OF EMBODIMENT

Hereinafter, an embodiment will be described in detail with reference to the accompanying drawings.

While inventing the embodiment disclosed herein, observations were made regarding a related art. Such observations include the following, for example.

When an input signal is outside the range of the condition of a signal indicating a particular class, it is difficult for a signal processing device to recognize the signal as a signal of the particular class. To be capable of recognizing the signal as a signal of the particular class, the signal processing device can learn the range of a signal in the particular class. Alternatively, in addition to the process concerning existing classes, a process for learning a new gesture that is input a plurality of times may be performed.

Accordingly, the embodiment disclosed herein, for example, provides a technique to recognize a signal that has not been able to be recognized.

<Example of Functional Configuration of Signal Processing Device>

Figure 1:
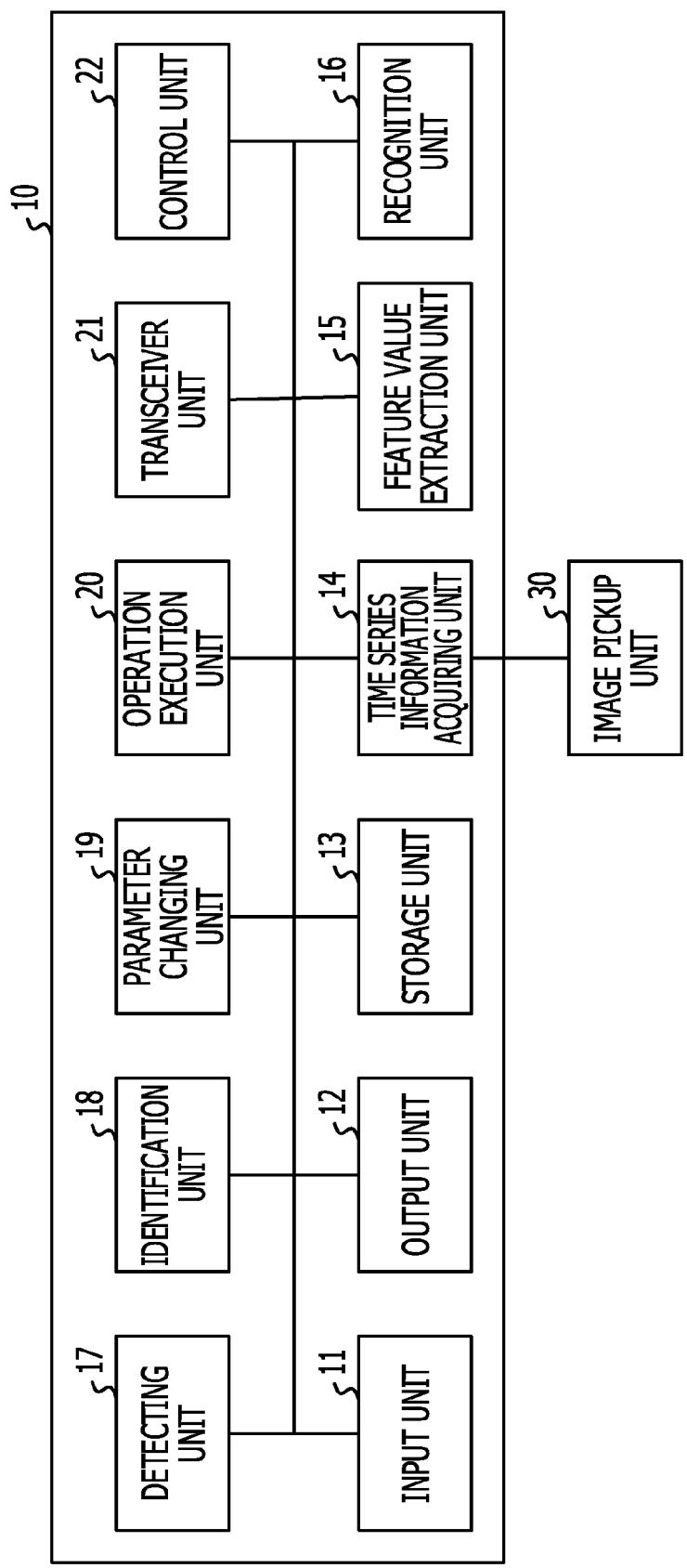
FIG. 1 illustrates an exemplary functional configuration of a signal processing device according to an exemplary embodiment.

FIG. 1 illustrates an exemplary functional configuration of a signal processing device according to the present exemplary embodiment. As illustrated in FIG. 1, a signal processing device 10 includes an input unit 11, an output unit 12, a storage unit 13, a time series information acquiring unit 14, a feature value extraction unit 15, a recognition unit 16, a detecting unit 17, an identification unit 18, a parameter changing unit (a recognition condition changing unit) 19, an operation execution unit 20, a transceiver unit 21, and a control unit 22.

The input unit 11 receives, from, for example, a user of the signal processing device 10, a variety of inputs, such as start and end of an instruction and input of settings. More specifically, the input unit 11 receives a variety of instructions, such as a time series information acquisition instruction, a feature value extraction instruction, a recognition instruction, a candidate motion detection instruction, an identification instruction, a parameter change instruction, an operation execution instruction, and a transmission and reception instruction.

For example, the input unit 11 may be formed from a keyboard and a mouse. Alternatively, the input unit 11 may be formed from a touch panel using a display screen. Still alternatively, the input unit 11 may be formed from a microphone or an image pickup device.

The output unit 12 outputs, for example, information input through the input unit 11 and information resulted from execution performed based on the input information. Note that for example, in the case of outputting display information, the output unit 12 may include a display unit, such as a display or a monitor. In the case of outputting sound, the output unit 12 may include an audio output unit, such as a speaker. In addition, the input unit 11 and the output unit 12 may be integrated with each other (for example, a touch panel).

The storage unit 13 stores a variety of types of information used in the present exemplary embodiment. More specifically, the storage unit 13 stores time series information regarding an input signal obtained from, for example, the input unit 11 or an image pickup unit 30 (for example, a camera) that captures the images indicating the motion of the hand and body of a user or the face of the user and a result of feature value extraction. In addition, the storage unit 13 stores a parameter (a recognition condition) used for identifying a class preset for a feature value (for example, a type of operation), a result of class type recognition, a result of candidate motion detection, a result of identification for each of users (persons), and a result of parameter change. Furthermore, the storage unit 13 stores a result of operation execution, a result of transmission and reception, setting information for the signal processes according to the present exemplary embodiment, user information for identifying a user, the progress of execution of the processes, and the results of the execution of the processes. However, it is to be noted that information stored in the storage unit 13 is not limited to the above-described information.

The storage unit 13 reads the stored information and writes information at a predetermined point in time as appropriate. In addition, the storage unit 13 may function as a database that allows the information to be systematically searched for using, for example, a keyword and be extracted. Examples of the storage unit 13 include a hard disk and a memory.

The time series information acquiring unit 14 acquires, for example, information regarding input operation, motion, or speech from the user in a time series manner. For example, the time series information acquiring unit 14 can acquire a moving image of user's hand or finger captured by the image pickup unit 30 (for example, a camera). However, the acquired information is not limited thereto. Note that in order for the identification unit 18 to identify a user who inputs an input signal, the time series information acquiring unit 14 may acquire the face image of the user from the image pickup unit 30.

The time series information acquiring unit 14 acquires, for example, information regarding the user's operation input through the input unit 11 in a time series manner. For example, the time series information acquiring unit 14 acquires an audio signal from a microphone (am example of the input unit 11) in a time series manner. Alternatively, the time series information acquiring unit 14 acquires a detection signal of the finger or a touch pen from a touch panel (an example of the input unit 11) in a time series manner. The time series information on the input signal acquired by the time series information acquiring unit 14 is stored in the storage unit 13.

The feature value extraction unit 15 extracts a feature value of, for example, user's motion, user's operation, user's action, or user's speech from the time series information on the input signal acquired by the time series information acquiring unit 14. For example, the feature value extraction unit 15 defines a hand gesture motion of the user as a feature value. In such a case, for example, the feature value extraction unit 15 extracts the orientation of the user's hand, the moving direction, the moving speed, and the number of repetitions of motion (for example, the number of turns) as a feature value. As used herein, the term "number of turns" refers to the number of turns of the hand when the user draws a circle in the air.

In addition, for example, the feature value extraction unit 15 extracts, from the variety of input signals, a feature value used to recognize the type of operation. For example, in the case of a video signal, the feature value extraction unit 15 extracts the coordinates of position of a desired object in an image and the shape of the object in the form of a feature value (for example, a moment feature). In the case of an audio signal, the feature value extraction unit 15 extracts the amplitude information and the cepstrum information (for example, Mel Frequency Cepstrum Coefficients (MFCC)) as a feature value. In the case of a touch operation, the feature value extraction unit 15 extracts the coordinates of detected touch position, a moving speed of the touch position, and a force of the touch in a time series manner as a feature value. However, the feature value extracted by the feature value extraction unit 15 is not limited thereto. The above-described feature values may be combined. The extracted feature value is stored in the storage unit 13.

The feature value extraction unit 15 extracts a time series of a feature value of the target input signal obtained from the previous frames of a moving image acquired from the image pickup unit 30. Thereafter, the feature value extraction unit 15 stores the extracted time series of feature values in the storage unit 13.

The recognition unit 16 identifies a class based on the feature value extracted by the feature value extraction unit 15 and a parameter (a recognition condition) for identifying a class (for example, a type of operation) preset for each of predetermined feature values stored in the storage unit 13. Thus, the recognition unit 16 recognizes the type of operation.

The recognition unit 16 recognizes the type of operation by, for example, determining whether the feature value extracted by the feature value extraction unit 15 is within the range of the feature value (the parameter) preset for each of the types of operation. If the feature value extracted by the feature value extraction unit 15 is within the range of the feature value of the parameter, the recognition unit 16 recognizes that the type of operation is the type of operation corresponding to the parameter.

If the recognition unit 16 can recognize the type of operation by comparing the extracted feature value with the parameter, the recognition unit 16 outputs the result of recognition to the operation execution unit 20. Thereafter, the recognition unit 16 performs a predetermined process. Note that in addition to a type of operation, the recognition unit 16 can recognize the class of, for example, a motion type, speech information, an action type, or a command type. In addition to changing the parameter for a single recognition condition, the recognition unit 16 may have a plurality of recognition conditions, that is, a "first recognition condition", which is a condition before the parameter is changed, and a "second recognition condition", which is a condition after the parameter is changed.

When the recognition unit 16 recognizes a particular class (for example, a type of operation), the detecting unit 17 retrieves a section of the time series information corresponding to the recognized feature value (a template feature). In addition, the detecting unit 17 retrieves the time series information prior to the currently retrieved section of the time series information. In addition, the detecting unit 17 determines whether the preceding time series signal has a section that is correlated with the time series signal of the recognized feature value. If the detecting unit 17 detects a correlated section, the detecting unit 17 defines the correlated section as a section.

For example, the detecting unit 17 compares the time series of feature values in the acquired candidate section with the time series of feature values of the recognized motion (the template feature) and detects a section having a similarity that is higher than or equal to a predetermined threshold value (a section) as a correlated section.

According to the present exemplary embodiment, one or more sections, that is, sections each having a similarity that is higher than or equal to the predetermined threshold value are detected. Learning is performed using the input signal corresponding to the section and serving as a learning sample. Thereafter, the parameter changing unit 19 changes the parameter. In this manner, according to the present exemplary embodiment, the feature value of the input signal is learned as a new learning sample. By using a parameter obtained through the learning, an input signal that was not previously recognized can be recognized when the signal is input next time and thereafter.

The detecting unit 17 may detect one or more candidate sections. Among the plurality of candidate sections, the detecting unit 17 may select the section detected first or last on a time axis as a candidate section. The detecting unit 17 may select a predetermined number of sections as candidate sections based on the similarity to the feature value for which the type of operation is recognized.

The identification unit 18 identifies a person who inputs the time series information. More specifically, the identification unit 18 identifies the user by comparing the user identification information (the user ID and password) input through, for example, the input unit 11 or the user face information acquired through the image pickup unit 30 with preset user information. Note that recognition of a person using his/her face can be made using a technique described in, for example, Ying-Hao Wang, Yen-Te Shih, K.-C. Cheng, Chih-Jui Lin, and Tzuu-Hseng S. Li, "Real-time image processing of human face identification for home service robot," Proc. of IEEE/SICE Int. Symp. On System Integration, pp. 1171-1176, 2011. However, the technique is not limited thereto.

In addition, the identification unit 18 can extract a parameter corresponding to the identified user from the parameters (the recognition conditions) each corresponding to one of users (persons) and prestored in the storage unit 13. Accordingly, the parameter changing unit 19 (described in more detail below) can change the parameter for only the identified particular person.

For example, a widely used gesture motion may significantly vary from user to user (from person to person). In such a case, the parameter may be changed for each of the users. Accordingly, as described in the present exemplary embodiment, by identifying a user, the type of operation can be recognized or changed using the parameter stored in the storage unit 13 and associated with the personal information regarding the identified user.

Note that if the operation performed through the identification unit 18 is an operation performed on a communication terminal owned by the user, such as a smartphone, it is highly likely that the communication terminal is used by only the owner. Accordingly, the function of the identification unit 18 may be removed.

The parameter changing unit 19 changes the recognition condition corresponding to a particular class recognized using a template feature so that a feature value that is detected by the detecting unit 17 and that was not previously recognized can be recognized as the class. For example, the parameter changing unit 19 eases the parameter (the recognition condition) identifying a class using a template feature so that even a feature value of a motion detected by the detecting unit 17 so as to have a high similarity is recognized as the same operation. However, the parameter to be changed by the parameter changing unit 19 is not limited thereto. Alternatively, if the user has already been identified by the identification unit 18, the parameter changing unit 19 may change the parameter (the recognition condition) preset for the identified user.

The parameter changed by the parameter changing unit 19 is stored in the storage unit 13. According to the present exemplary embodiment, by using the parameter changed by the parameter changing unit 19, an operation that was not previously recognized in the recognition process performed by the recognition unit 16 can be recognized next time and thereafter.

Note that the parameter changing unit 19 stores the parameter (the first recognition condition) in the storage unit 13 before changing the parameter. Subsequently, the parameter changing unit 19 changes the parameter in the above-described manner. If a predetermined condition is satisfied, the parameter changing unit 19 changes back the changed parameter (the second recognition condition) to the parameter before the change (the first recognition condition). This process is referred to as an "initialization process". As used herein, the term "predetermined condition" refers to at least one of elapse of a predetermined period of time, completion of a predetermined motion, and reception of an instruction from the user. However, the predetermined condition is not limited thereto. In this manner, the case in which similar feature value and recognition condition significantly differ from the originals can be avoided and, thus, misrecognition of the type of operation can be avoided.

The operation execution unit 20 performs an operation based on the result of recognition acquired by the recognition unit 16. Note that examples of the operation include but not limited to: jumping to the next page or the previous page, zooming in or out a page, printing, and starting or ending a predetermined application (for example, a web browser, a word processor, spreadsheet software, mail software, social networking service (SNS) software).

The transceiver unit 21 is a communication unit for receiving and transmitting a variety of information items from and to external devices via a communication network, such as the Internet or a local area network (LAN). The transceiver unit 21 can receive a variety of information items prestored in the external devices and also can transmit the result of processing performed by the signal processing device 10 to the external devices via, for example, the communication network.

The control unit 22 controls all of the components of the signal processing device 10. More specifically, for example, the control unit 22 performs a variety of processes regarding a signal in response to an instruction received from, for example, the user through the input unit 11. Examples of the variety of processes include causing the time series information acquiring unit 14 to acquire time series information, causing the feature value extraction unit 15 to extract a feature value, causing the recognition unit 16 to recognize a user operation, and causing the detecting unit 17 to detect a candidate section. In addition, examples of the variety of processes include, but not limited to, causing the identification unit 18 to identify the user, causing the parameter changing unit 19 to change the parameter, and causing the operation execution unit 20 to execute a process corresponding to the type of operation.

While description has been made with reference to the image pickup unit 30 disposed outside the signal processing device 10 (refer to FIG. 1), the location of the image pickup unit 30 is not limited thereto. For example, the image pickup unit 30 may be included in the signal processing device 10.

Examples of the signal processing device 10 include, but not limited to, a personal computer (PC), a server, and a communication terminal, such as a smartphone or a tablet, and a cell phone. Examples of the signal processing device 10 further include a game machine, a music reproduction system, an automotive navigation system, and so on.

Through the above-described configuration according to the present exemplary embodiment, a signal that was not previously recognized can be recognized. Note that by, for example, acquiring a signal in a candidate section using the detecting unit 17, the signal processing device 10 can obtain information as to what input mistake (wrong motion) the user has made.

Hardware Configuration of Signal Processing Device

According to the present exemplary embodiment, by installing an execution program (a signal processing program) that can cause a computer to perform the variety of functions in, for example, a general-purpose PC or a communication terminal (for example, a smartphone), the signal process of the present exemplary embodiment can be performed. An exemplary hardware configuration of the computer (the signal processing device 10) that can perform the signal process of the present exemplary embodiment is described next with reference to the accompanying drawings.

Figure 2:
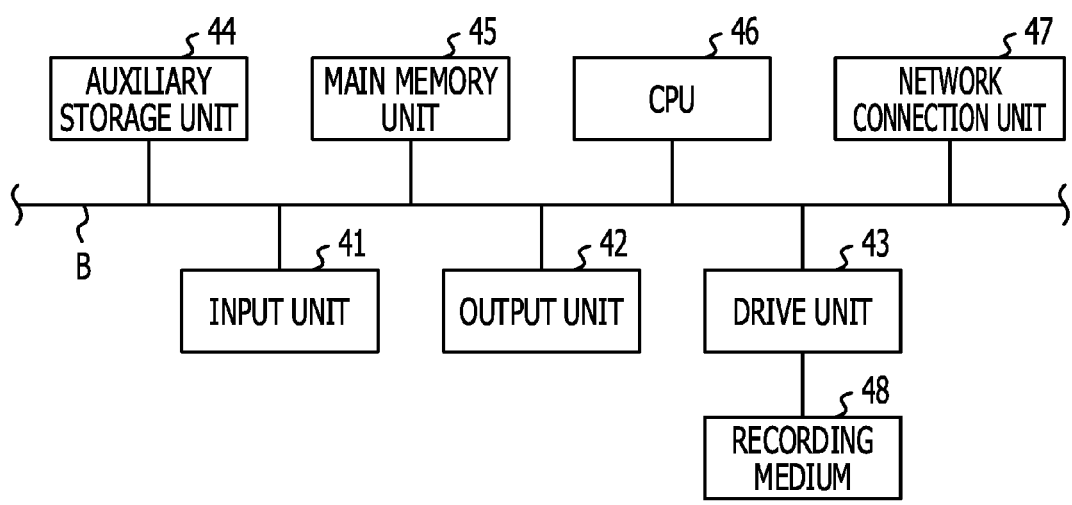
FIG. 2 illustrates an exemplary hardware configuration that allows a signal process to be performed.

FIG. 2 illustrates an exemplary hardware configuration that allows the signal process to be performed. As illustrated in FIG. 2, a computer body includes an input unit 41, an output unit 42, a drive unit 43, an auxiliary storage unit 44, a main memory unit 45, a central processing unit (CPU) 46 that performs a variety of control processes, and a network connection unit 47. These units are connected to one another via a system bus B.

The input unit 41 includes a keyboard and a pointing device, such as a mouse, operated by the user and an audio input device, such as a microphone. The input unit 41 receives, from, for example, the user, an instruction to execute a program, a variety of operation information items, and information used for starting software.

The output unit 42 includes a display device that displays a variety of windows and data used for controlling the computer that performs the processes of the present exemplary embodiment. Thus, the progress and the interim results of the execution of the program can be displayed using the control program of the CPU 46.

Note that according to the present exemplary embodiment, the execution program to be installed in the computer is provided using, for example, a removable recording medium 48, such as a universal serial bus (USB) memory, a compact disc read only memory (CD-ROM), or a digital versatile disk (DVD). The recording medium 48 storing the program can be set in the drive unit 43. The execution program stored in the recording medium 48 is installed from the recording medium 48 in the auxiliary storage unit 44 via the drive unit 43 in response to a control signal output from the CPU 46.

An example of the auxiliary storage unit 44 is a storage unit, such as a hard disk drive or a solid state drive (SSD). The auxiliary storage unit 44 stores the execution program according to the present exemplary embodiment and a control program for the computer in response to a control signal output from the CPU 46 and performs an input and output operation as appropriate. The auxiliary storage unit 44 can read and write desired information items among the stored information items in response to a control signal output from the CPU 46.

The main memory unit 45 stores, for example, the execution program read from the auxiliary storage unit 44 by the CPU 46. For example, a read only memory (ROM) or a random access memory (RAM) is used as the main memory unit 45. The auxiliary storage unit 44 and the main memory unit 45 correspond to, for example, the storage unit 13 described above.

The CPU 46 performs overall control of the computer and, thus, can perform a variety of arithmetic processes and an input and output processes of data from and to each of the hardware components based on the control program, such as an operating system, and the execution program stored in the main memory unit 45. A variety of information items used for execution of the program can be retrieved from the auxiliary storage unit 44. In addition, the results of execution can be stored in the auxiliary storage unit 44.

More specifically, the CPU 46 executes the program installed in the auxiliary storage unit 44 in response to, for example, an execution instruction received from the input unit 41. In this manner, the CPU 46 performs the process corresponding to the program in the main memory unit 45. For example, by executing a signal processing program, the CPU 46 can perform the processes for acquiring the above-described time series information using the time series information acquiring unit 14, extracting a feature value using the feature value extraction unit 15, and recognizing the type of operation using the recognition unit 16. The CPU 46 can further perform the processes for detecting a candidate operation using the detecting unit 17, identifying a person using the identification unit 18, changing the parameter using the parameter changing unit 19, and executing an operation using the operation execution unit 20. Note that the processes performed by the CPU 46 are not limited thereto. The results of the processes performed by the CPU 46 are stored in the auxiliary storage unit 44 as appropriate.

The network connection unit 47 is connected to, for example, a communication network in response to a control signal received from the CPU 46. Thus, the network connection unit 47 receives the execution program, the software, and setting information from, for example, an external device connected to the communication network. In addition, the network connection unit 47 can provide the results obtained by executing the program or the execution program according to the present exemplary embodiment to the external device.

Through the above-described hardware configuration, the signal process according to the present exemplary embodiment can be performed. In addition, by installing the program in a general-purpose PC and a communication terminal, the signal process according to the present exemplary embodiment can be easily performed.

Exemplary Process Performed by Signal Processing Device

Figure 3:
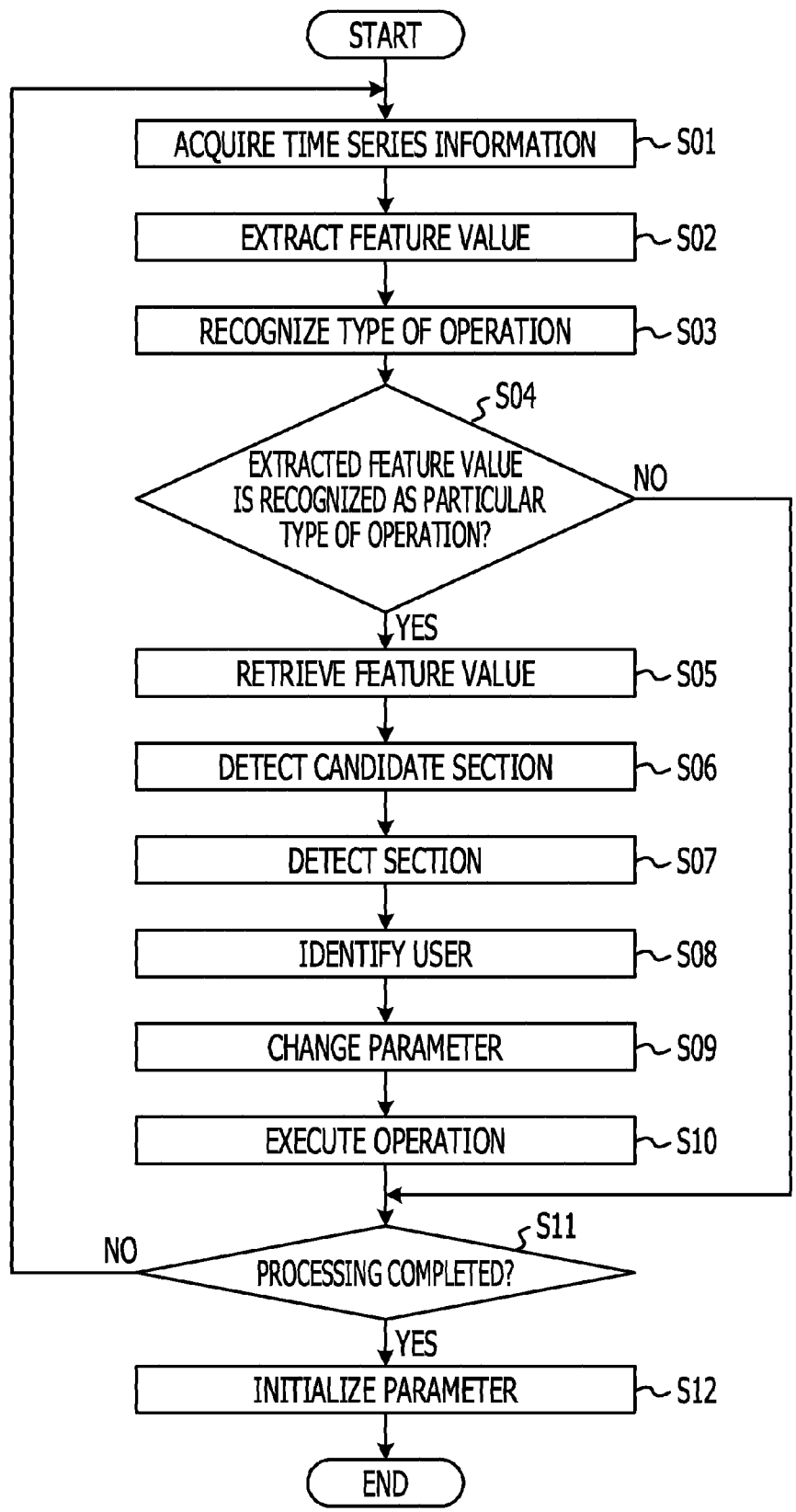
FIG. 3 is a flowchart illustrating an exemplary process performed by the signal processing device according to the exemplary embodiment.

An exemplary process performed by the signal processing device 10 according to the present exemplary embodiment is described below with reference to a flowchart. FIG. 3 is a flowchart illustrating the exemplary process performed by the signal processing device 10 according to the present exemplary embodiment.

As illustrated in FIG. 3, the time series information acquiring unit 14 of the signal processing device 10 acquires the time series information regarding an input signal from the user (S01). Examples of the input signal include, but not limited to the motion of the hand or body of the user (the gesture motion) acquired from the image pickup unit 30 in the above-described manner, audio information, and a detection signal of the position of the finger or a touch pen on a touch panel. Note that the process performed in S01 may involve acquiring the time series information prestored in the storage unit 13 in addition to acquiring the time series information from the image pickup unit 30.

The feature value extraction unit 15 of the signal processing device 10 extracts the feature value from the acquired time series information (S02).

The recognition unit 16 of the signal processing device 10 compares the extracted feature value with the parameter (the first recognition condition) for recognizing a preset particular type of operation (a class) to recognize the type of operation (S03). In this manner, the recognition unit 16 determines whether the extracted feature value is recognized as the preset particular type of operation (S04).

In S03, the recognition unit 16 determines whether the feature value extracted in S02 is within, for example, the range of the feature preset for the type of operation. If the feature value extracted in S02 is within the range of the feature value preset for the type of operation, the recognition unit 16 recognizes the feature value extracted in S02 as the type of operation corresponding to the parameter.

If the recognition unit 16 can recognize the feature value extracted in S02 as a particular type of operation (YES in S04), the detecting unit 17 of the signal processing device 10 retrieves the feature value of that portion (S05). Subsequently, the detecting unit 17 of the signal processing device 10 detects at least one candidate section having a feature value that is similar to the retrieved feature value from the time series information preceding the point in time when the type of operation is recognized based on the retrieved feature value (S06).

Subsequently, the detecting unit 17 of the signal processing device 10 detects, from among the sections detected in S06, a section having a similarity that is higher or equal to a predetermined threshold value as a section (S07). While, in S07, the section has been detected by the detecting unit 17 using the threshold value as a reference value, another detection method may be employed. For example, from among the sections detected in S06, the sections detected in a predetermined order (for example, the first section or the last section) may be selected as a candidate section. Alternatively, the detecting unit 17 may detect a predetermined number of sections in decreasing order of similarity.

Subsequently, the identification unit 18 of the signal processing device 10 identifies the user (S08). The parameter changing unit 19 of the signal processing device 10 changes the parameter (the recognition condition) (S09). At that time, for example, the parameter used in S03 is changed so as to be eased. As a result, the input signal input in the section detected in S07 is also recognized as the type of operation that is the same as that recognized in S03. However, the method for changing the parameter is not limited thereto.

In addition, if the person (the user) is identified in S08, the parameter changing unit 19 of the signal processing device 10 changes the recognition condition of the parameter set for the user. However, if the person is not identified in S08, the parameter changing unit 19 of the signal processing device 10 changes a common parameter. Thereafter, the operation execution unit 20 of the signal processing device 10 performs an operation corresponding to the input signal based on the type of operation recognized in S03 as described above (S10).

If, in S04, the input signal has not been recognized as a particular type of operation (NO in S04) or if the processing proceeds from S10, the signal processing device 10 determines whether the processing is to be completed based on, for example, an user instruction (S11). If the processing is not completed (NO in S11), the processing performed by the signal processing device 10 returns to S01. Thereafter, the process in S01 and the subsequent processes are performed. In such a case, the parameter referenced in S03 is the parameter changed in S09 (that is, the second recognition condition). Accordingly, in the next processing and thereafter, the recognition unit 16 can recognize an input signal that was not previously recognized as the type of operation.

However, if, in S11, the processing is to be completed in response to, for example, a user instruction (YES in S11), the parameter changing unit 19 of the signal processing device 10 may initialize the parameter changed in S09 (the second recognition condition) into the original parameter (the first recognition condition) before completing the processing (S12). In this manner, misrecognition caused by overexpanding the parameter does not occur. Note that the point in time at which the parameter is initialized is not limited to the point in time in S12. For example, the parameter may be initialized after a predetermined period of time has elapsed or when an instruction is received from the user.

Through the above-described signal processing, a signal that was not previously recognized can be recognized.

Example of Signal Processing

A particular example of the above-described signal processing is described below with reference to the accompanying drawings. Note that the following description is made with reference to the case in which a gesture motion of the user is acquired from a video (time series image frame information) captured by the image pickup unit 30 and, thereafter, the type of operation is recognized. At that time, the output feature value represents the center of gravity coordinates of the hand of the user.

Example of Feature Value Extraction Process

Figure 4:
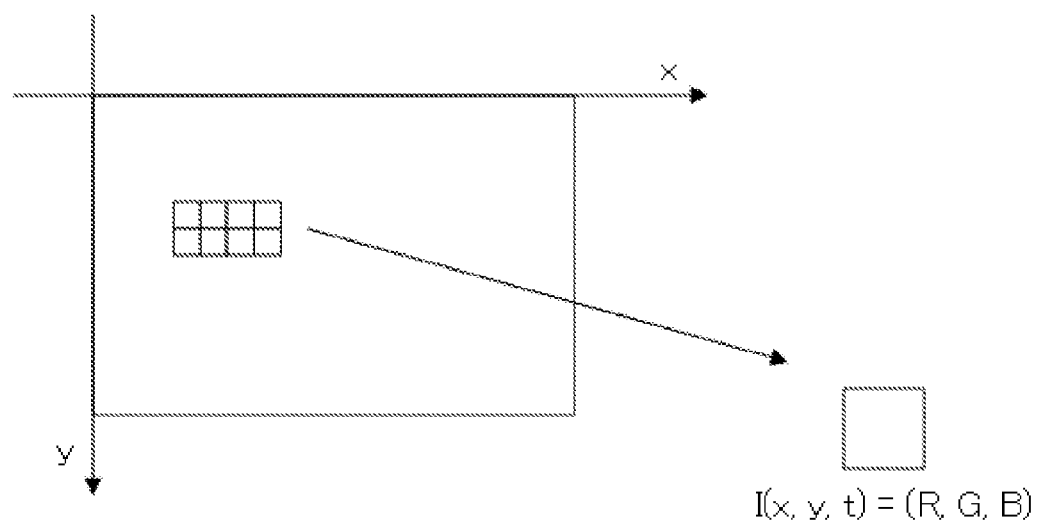
FIG. 4 illustrates an example of an input image of a frame t.

An example of the above-described feature value extraction process is described in detail first. FIG. 4 illustrates an example of an input image of a frame t. According to the present exemplary embodiment, the feature value extraction unit 15 of the signal processing device 10 extracts the feature value from time series image information $I(x, y, t)$.

For example, the image information $I(x, y, t)$ represents a color image in a given color space and has a coordinate system $(x, y)$ having an origin at the upper left corner of the image. In addition, a frame t is a frame captured at a time t in the time series. That is, according to the present exemplary embodiment, as illustrated in FIG. 4, the feature value extraction unit 15 of the signal processing device 10 extracts the feature value based on the color information (R, G, B) of the pixels corresponding to the coordinates of each of the frames.

Note that in the example illustrated in FIG. 4, a frame image is provided in the RGB color space. However, information based on a color space such as YUV or HSV may be input. If information based on a color space such as YUV or HSV is input, the information can be converted into information in another color space.

When the coordinates of the positions of the hand in images are used as the time series of the feature value, the feature value extraction unit 15 of the signal processing device 10 retrieves a portion having a flesh color from a frame image. Thereafter, the feature value extraction unit 15 removes a face portion as appropriate to obtain the image of a hand region.

The centers of gravity coordinates of the hand region are used as the coordinates of the hand.

For example, when a skin region is detected and if the image data is converted from an RGB color space into an HSV color space, the following equations are used:

$$V = \text{MAX}(R, G, B) \qquad (1)$$
$$S = \frac{\text{MAX}(R, G, B) - \text{MIN}(R, G, B)}{V}$$
$$H = \cos^{-1}\left\{\frac{(G-B)+(G-R)}{2\sqrt{(G-B)^2+(G-R)(B-R)}}\right\}$$

Figure 5:
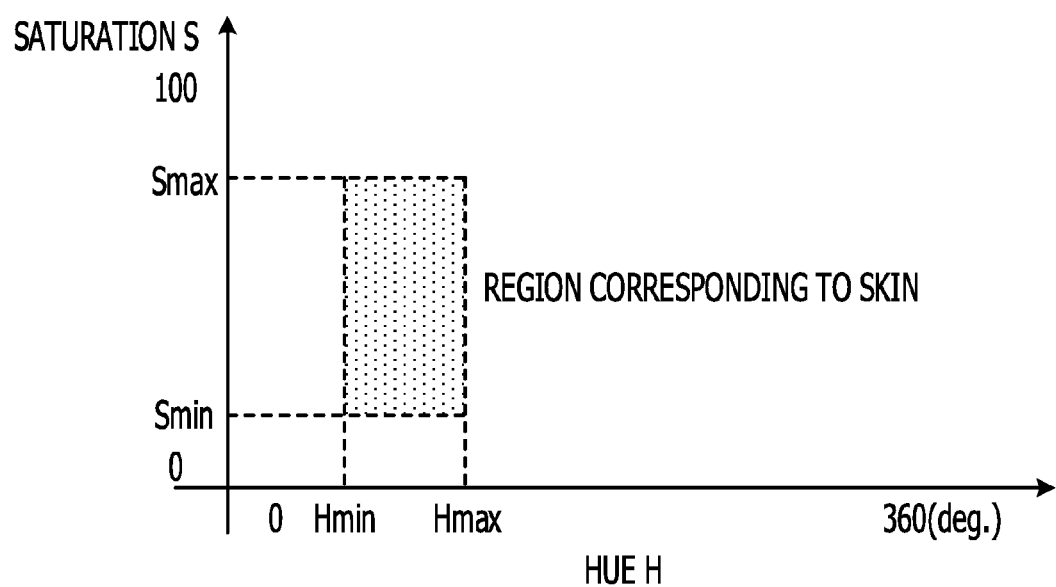
FIG. 5 illustrates an example of a skin region in an HS plane.

FIG. 5 illustrates an example of a skin region in an HS plane. According to the present exemplary embodiment, when converting the image data from an RGB color space into an HSV color space using equation (1), the feature value extraction unit 15 of the signal processing device 10 converts the RGB value of each of the pixels into the HSV value and extracts, as skin pixels, only pixels each having a color value V higher than or equal to a threshold value and having a particular value for each of a hue H and a saturation S. At that time, the saturation S can be obtained using the following equation:

$$S_M = |R\vec{r} + G\vec{g} + B\vec{b}| \qquad (2)$$
$$= \left|\left(\frac{(R-G)+(R-B)}{2}\right),\left(\frac{\sqrt{3}(G-B)}{2}\right)\right|$$
$$= \sqrt{\left(\frac{(R-G)+(R-B)}{2}\right)^2 + \left(\frac{\sqrt{3}(G-B)}{2}\right)^2}$$

where
$$\vec{r} = (1, 0)$$
$$\vec{g} = \left(-\frac{1}{2}, \frac{\sqrt{3}}{2}\right)$$
$$\vec{b} = \left(-\frac{1}{2}, -\frac{\sqrt{3}}{2}\right)$$

In an image obtained through the above-described operation, a pixel indicating a skin has a value of "1", and a pixel not indicating a skin has a value of "0". This image is written as a skin image Ct=C(x, y, t).

Figure 6:
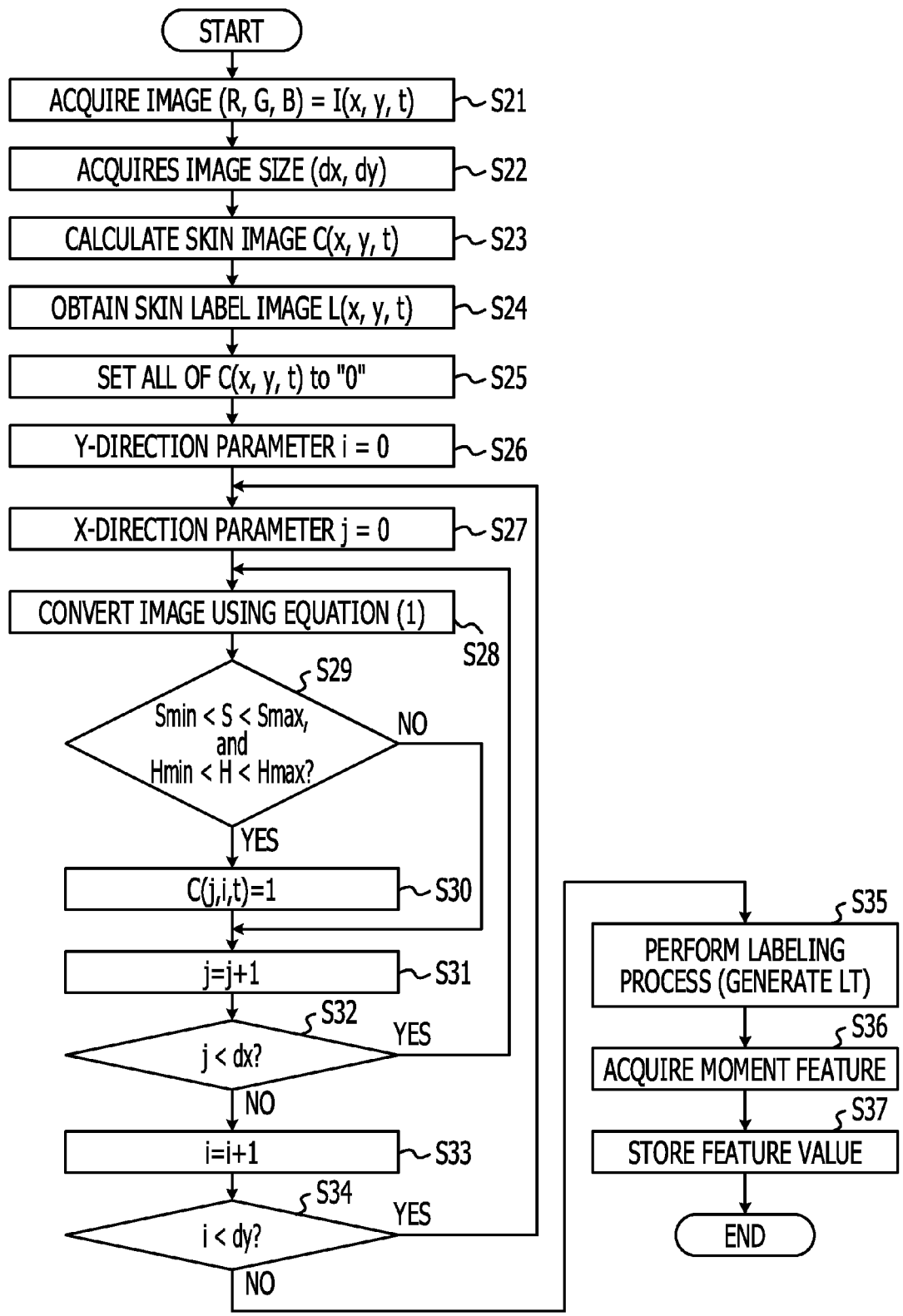
FIG. 6 is a flowchart of a process performed by a feature value extraction unit.

An example of the above-described process performed by the feature value extraction unit 15 is described next with reference to a flowchart. FIG. 6 is a flowchart of the process performed by the feature value extraction unit 15. The feature value extraction unit 15 of the signal processing device 10 acquires the color information (R, G, B) of each of the pixels in a frame (an image (R, G, B)=I(x, y, t)) first (S21) and, thereafter, acquires an image size (dx, dy) (S22).

The feature value extraction unit 15 of the signal processing device 10 calculates a skin image C(x, y, t) using the above-described processes (S23) to obtain a skin label image L(x, y, t) (S24). At that time, in the feature value extraction process, all of C(x, y, t) are set to an initial value of "0" (S25), a Y-direction parameter i is set to "0" (S26), and an X-direction parameter j is set to "0" (S27).

The feature value extraction unit 15 of the signal processing device 10 converts the image from the RGB color space into the HSV color space using equation (1) (S28). The feature value extraction unit 15 of the signal processing device 10 determines whether each of the values of the saturation S and the hue H in the converted HSV space is greater than a predetermined minimum value and is less than a predetermined maximum value (S29). That is, in S29, the feature value extraction unit 15 of the signal processing device 10 obtains the saturation S and the hue H for each of the pixels and determines whether the obtained value is within a predetermined threshold value range (Smin<S<Smax, and Hmin<H<Hmax).

At that time, if, in S29, the condition is met ("YES" in S29), only the corresponding pixel in the skin image C having the values within the ranges is set to "1" (C(j, i, t)=1) (S30). However, if the processing proceeds from S30 or if, in S29, the condition is not met ("NO" in S29), the feature value extraction unit 15 of the signal processing device 10 increments the value of j by one (+1) (S31) and determines whether j is less than dx (S32).

If j is less than dx (YES in S32), the processing performed by the feature value extraction unit 15 of the signal processing device 10 returns to S28. However, if j is not less than dx (NO in S32), the feature value extraction unit 15 of the signal processing device 10 increments i by one (+1) (S33) and determines whether i is less than dy (S34). If i is less than dy (YES in S34), the processing returns to S27.

However, if i is not less than dy (NO in S34), the feature value extraction unit 15 of the signal processing device 10 generates a label table (LT) through a labeling process (S35). The feature value extraction unit 15 of the signal processing device 10 acquires a feature value, such as a moment feature, (S36) and stores the acquired feature value of the hand in, for example, the storage unit 13 (S37).

Note that in the feature value extraction process illustrated in FIG. 6, the feature value extraction unit 15 of the signal processing device 10 performs a labeling process as illustrated in S35 to remove a small region. However, the above-described process may be removed. The labeling process (a connected component process) is performed in order to define a separation and connection relationship among regions. Two pixels in two skin regions that are connected with each other via only a skin region are provided with the same label, and two pixels in two skin regions that are not connected with each other are provided with different labels. In addition, in S35, the feature value extraction unit 15 of the signal processing device 10 generates a label table (LT) that indicates a separation and connection relationship among regions based on the labels provided using the above-described technique. In this manner, information as to whether a region is isolated can be obtained. Thereafter, by deleting a region with a label having a pixel of a value that is less than or equal to a predetermined threshold value Th, only a skin region which is a small region can be removed. Note that such a technique for labeling is described in R. M. Haralick and L. Shapiro, "Computer and robot vision", Addison-Wesley, pp. 28-48, 1992. However, the labeling technique is not limited thereto.

According to the present exemplary embodiment, through the above-described processes, a region used for, for example, gesture recognition is determined. For example, in order to delete a face region, by deleting a region that overlaps a face region detected using a face detection algorithm, only a desired region can be processed.

As a result, the feature value extraction unit 15 of the signal processing device 10 can extract the center of gravity coordinates (xt, yt) of each frame (=a primary moment feature) as a feature value w(t). In addition, as another feature value, a moment feature MO having secondary moment features such as sizes Mxx, Mxy, and Myy of a region as elements may be used. In this manner, in addition to the above-described primary moment feature, a high-dimensional feature vector can be used.

The time series of the feature value obtained using the above-described technique is represented as w(t)=w(i, t), where i={0, ..., D}. D represents the feature dimension, and t represents the time. For example, since the above-described gesture recognition has two dimensions of x and y, D=2.

Example of Recognition Process

An example of the above-described recognition process is described in more detail below. If the above-described feature value is generated in a time series manner, the recognition unit 16 performs recognition of, for example, the type of operation using the time series of the feature value. If the recognition unit 16 uses, for example, a support vector machine, the support vector machine can be given as follows:

$$f(x) = \text{sign}\left(\sum_{t=0}^{t'} w_{z+t}^T x_t + b_t\right) \quad (3)$$

The recognition unit 16 can determine whether the feature value is included in a particular class (for example, a particular gesture) using the sign of the output f in equation (3) (that is, positive or negative). Note that t' denotes a time window. z denotes the offset to a given time. In addition, $x_t$ and $b_t$ denote the parameters for operating a classification plane. In particular, $x_t$ represents a D-dimensional parameter vector. The value of an element i of the parameter vector is written as $x_{it}$. By changing the parameter values $x_{it}$ and $b_t$, a different result can be output although the same feature value is input. Values obtained through learning in advance are given to the parameters $x_t$ and $b_t$.

Alternatively, according to the present exemplary embodiment, a decision tree, for example, can be used as another classifier. In Iterative Dichotomiser 3 (ID3) that generates a decision tree, the dimensions of the feature value are considered to be independent from one another. For a feature dimension i, the entropy obtained when separation is made using a threshold value j is written as M(i, j).

The smallest value $M_j(i)$ of M(i, j) obtained when j is changed is represented as $M_j(i) = \min_j M(i,j)$. Separation at the optimum feature value can be given as $M_{ij} = \min_i M_j(i)$.

By, after selecting a classifier in a first stage as described above, repeating the above-described operation using a feature dimension other than the feature dimensions used for each of the separated classes, a decision tree can be generated. Note that in classification, determination begins with the layer of the root of the tree using the feature value used for the classification and, subsequently, the processing can proceed for the next layer.

Another example of a classifier is Boosting. In Boosting, a strong learner H is generated by combining a plurality of (weak) learners $h_j$. Let j be the number of connections between learners, and let N be the number of samples $x_i$ having correct solutions $y_i$. Then, decision is made using the sign of the following equation:

$$H(x) = \sum_{j=0}^{J} c_j h_j(x) \quad (4)$$

If the sign of equation (4) is positive, the sample x is included in a desired class. However, if the sign of equation (4) is negative, the sample x is not included in the desired class. In equation (4), h denotes one of the learners. Let $w_j$ denote the weight of the learner, and let $w_i$ denote the weight of one of the samples. The initial value of $w_i$ is set to 1/N. In addition, a learner $h_j(x)$ learns using the weight $\{w_i\}$ (an optimal weak learner is selected). Note that the learner is a learner that minimizes $\text{err}_j = E$ (the sample in which $y_i \neq h_j(x_i)$), where E represents an expectation. That is, when $\text{err}_j = E$ (the sample in which $y_i \neq h_j(x_i)$) and the following equation (5) is used, the weight for each of the samples is updated. Thereafter, j is sequentially incremented.

$$c_j = \log\left(\frac{1 - \text{err}_j}{\text{err}_j}\right) \quad (5)$$

Furthermore, by using the following equation (6), w is normalized:

$$w_i \leftarrow w_i \exp\left[\sum_{y_i \neq f_j(x_j)} c_j\right] \quad (6)$$

Alternatively, according to the present exemplary embodiment, as another example of classification, a neural network can be applied (refer to, for example, Japanese Laid-open Patent Publication No. 2003-080484). Still alternatively, according to the present exemplary embodiment, as another example, simpler threshold value processing can be applied. For example, a classification process using a threshold value $b_t$ can be applied as follows:

$$f(x) = \begin{cases} 1 & \max(w(i,t)) < b_t \\ -1 & \text{Otherwise} \end{cases} \quad (7)$$

In this case, if f(x)=1, the sample x is included in a particular class. Otherwise (for example, if f(x)=-1), the sample x is not included in the particular class. However, according to the present exemplary embodiment, the recognition technique is not limited thereto.

Example of Section Detection Process

An example of the section detection process is described in detail next. If the recognition unit 16 recognizes that the feature is included in a particular class (for example, some type of operation), the detecting unit 17 acquires the time series of the feature value w(t) and the offset time z. In addition, the detecting unit 17 retrieves the time series of the feature value w(t) from the time z to a time z+t' as a template feature. The template feature is defined as s(t). That is, s(t)=w(t+z), where t={0, ..., t'}. Furthermore, the detecting unit 17 retrieves a section of frames (Nf+Nb+1), which includes the previous frame Nf and the next frame Nb of the frame detected through the above-described process. This retrieved section is defined as a time series of a feature value.

Figure 8:
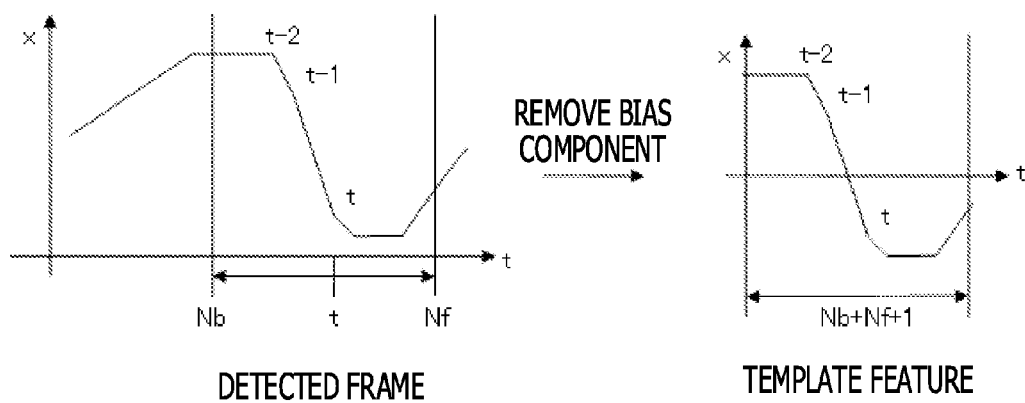
FIG. 8 illustrates an example of extraction of a time series of a feature value used for detecting a candidate section.

FIG. 7 illustrates the motion of the hand and its transition. FIG. 8 illustrates an example of extraction of a time series of a feature value used for detecting a candidate section. In the example illustrated in FIG. 7, a frame at a predetermined time t (a frame t), a frame immediately preceding the frame t (a frame t−1), and a frame immediately preceding the frame t−1 (a frame t−2) are extracted.

The detecting unit 17 extracts a feature value based on, for example, the above-described position and motion of the hand (refer to arrows illustrated in FIG. 7) from each of the image frames and extracts, from the time series transition of the feature value (the time t), a portion in which the hand moves more than a predetermined threshold value (Thd). In addition, the detecting unit 17 follows the extracted portion in a time series manner and, thus, detects a candidate section. Note that in the above-described example, a frame-by-frame displacement of the feature value of the hand is used. However, the displacement is not limited thereto. For example, a candidate section may be detected based on a displacement of the feature value at several-frame intervals.

The detecting unit 17 detects, from the time series of the feature value extracted by the feature value extraction unit 15, a detected frame section (Nb to Nf) based on, for example, three frames illustrated FIG. 7. In addition, the detecting unit 17 may remove a bias component and detect a template section (Nf+Nb+1 frames). The bias component can be removed by averaging the extracted time series of feature values and subtracting the average from the original signal to generate a new time series of a feature value. However, removal of a bias component is not limited thereto. When, for example, the range of the signal value is from 0 to 255, the detecting unit 17 can control the range so that the center of the feature value is 0 (the origin) by removing a bias component (for example, the range is changed to a range from −128 to 128 by removing a bias component). In this manner, calculation of a correlation (described in more detail below) can be facilitated.

Example of Candidate Section Detecting Process Performed by Detecting Unit

An example of a candidate section detecting process performed by the detecting unit 17 is described in detail below. For example, the detecting unit 17 sets the range of a candidate section for detecting a time series of a feature value that is similar to the template feature appearing before a time z. For example, if, in a section defined by ±Δt from a predetermined time t, a difference between the largest value and the smallest value (an absolute difference) is greater than a predetermined threshold value (Th), the time t of interest is defined as a candidate section point. This operation is repeated backward in time so that a candidate section point is extracted.

A time point to which the time t of interest traces back may be the time point at which the user started inputting some signal. However, the time point is not limited thereto. For example, the time point may be set to a predetermined time, such as a time 10 seconds before the current time. In addition, if a period of time between two neighboring candidate section points is longer than or equal to 2Δt, the start point of the candidate section is set to the current position t, and the end point of the candidate section is set to the time at which the template feature is retrieved first.

FIGS. 9A to 9D illustrate an example of detection of a candidate section made by the detecting unit. FIG. 10 is a flowchart of an example of a candidate section detecting process performed by the detecting unit.

Figure 9:
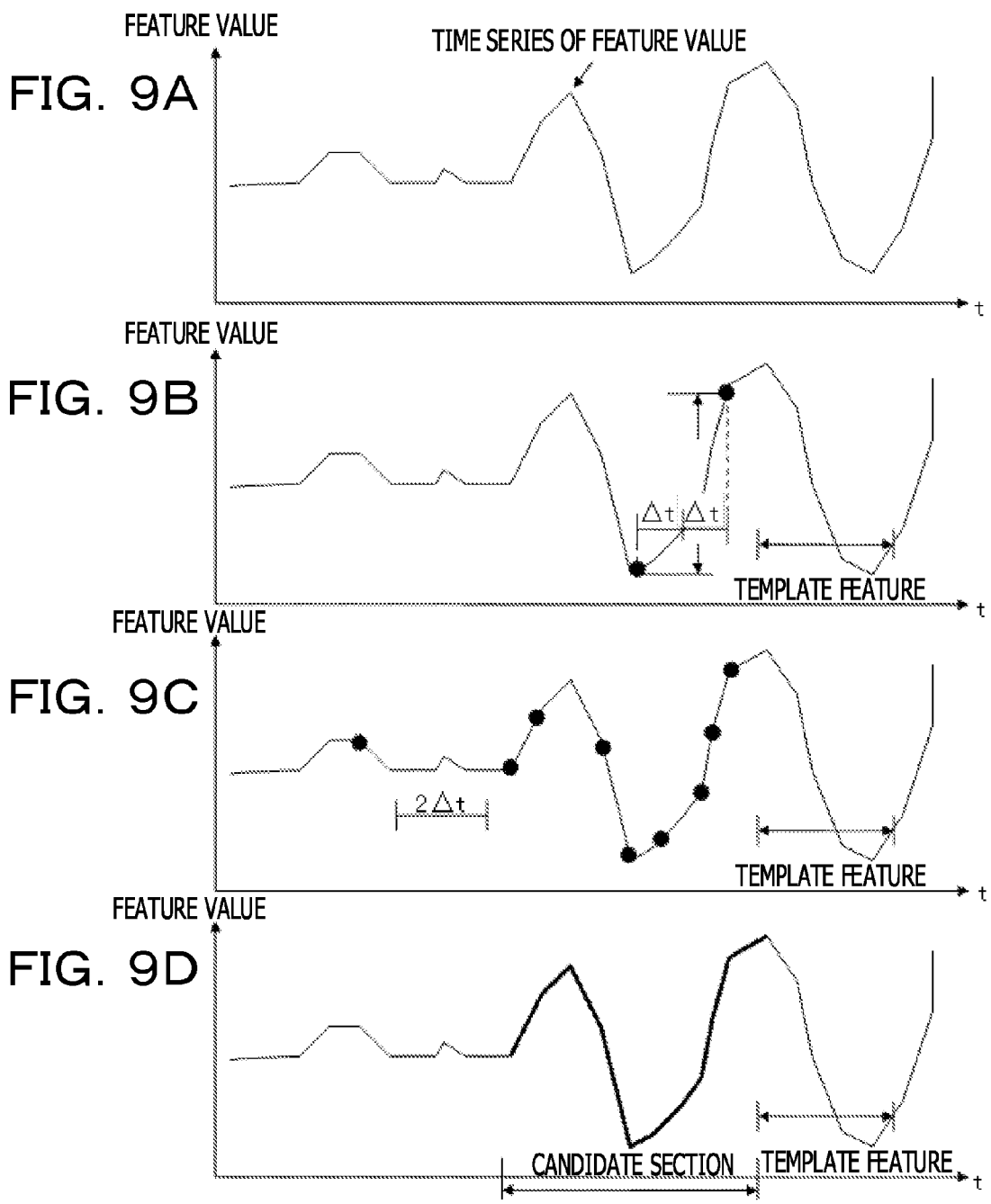
FIGS. 9A to 9D illustrate an example of detection of a candidate section made by a detecting unit.
Figure 10:
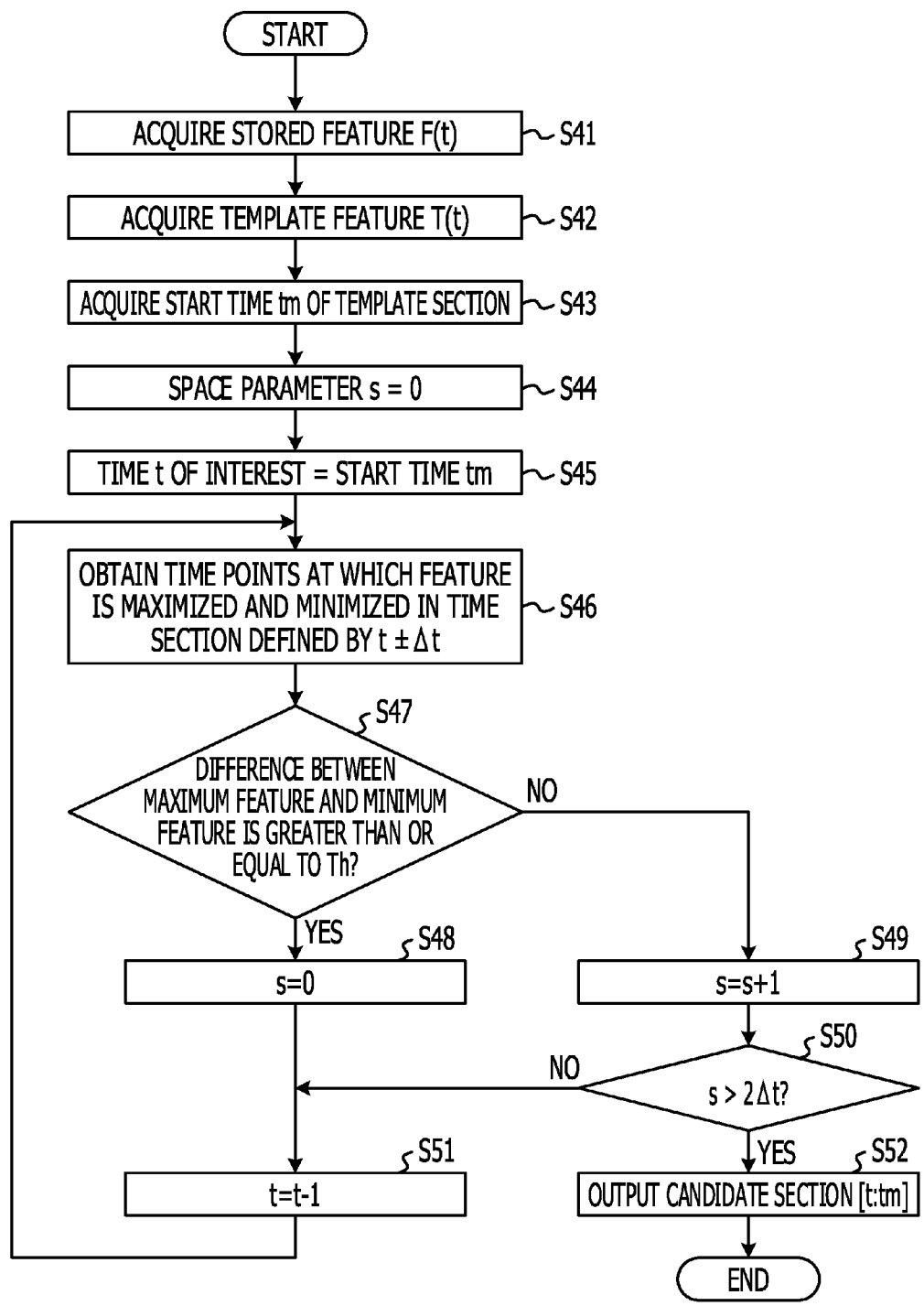
FIG. 10 is a flowchart of an example of a candidate section detecting process performed by the detecting unit.

According to the present exemplary embodiment, the detecting unit 17 acquires a feature value corresponding to the time series information acquired as the time t passes as illustrated in FIG. 9A (that is, a time series of a feature value). Subsequently, as illustrated in FIG. 9B, the detecting unit 17 detects a section of the template feature in the above-described manner and acquires a time at which, for example, the feature value is maximized and a time at which the feature value is minimized in a section defined by ±Δt from the time t prior to the start time of the detected section (the time points corresponding to the positions indicated by black circles in FIG. 9B). The detecting unit 17 performs the above-described process while shifting the time t by a predetermined time interval. Thus, as illustrated in FIG. 9C, the detecting unit 17 acquires one or more time points (the time points corresponding to the positions indicated by black circles in FIG. 9C).

Furthermore, by connecting sections for which a difference between the feature values at two times obtained in the above-described process is greater than or equal to the predetermined threshold value Th and the two time points are within a predetermined range (for example, 2Δt), the detecting unit 17 can detect a candidate section, as illustrated in FIG. 9D.

More specifically, as illustrated in FIG. 10, the detecting unit 17 acquires a time series of a feature value F(t) illustrated in FIG. 9A stored in, for example, the storage unit 13 (S41) and acquires a template feature T(t) (S42). In addition, the detecting unit 17 inputs a start time tm of the section from which the template feature T(t) is acquired in S42 (that is, the template section) (S43).

Subsequently, the detecting unit 17 sets a space parameter s used for setting a candidate section to the initial value (the space parameter s=0) (S44). Note that the space parameter s is used to control, in the subsequent process, a time interval during which a difference between the largest feature value and the smallest feature value obtained at two time points is less than the threshold value (that is, a time interval during which the motion is small).

The detecting unit 17 sets the time t, which is a time of interest used for processing, to the start time tm obtained in S43 (S45). Thereafter, the detecting unit 17 obtains a time point at which the feature value is maximized and a time point at which the feature value is minimized in a time section defined by t±Δt (S46).

The detecting unit 17 determines whether a difference between the largest feature value and the smallest feature value obtained at the two time points in S46 is greater than or equal to the threshold value Th (S47). If the difference between the largest feature value and the smallest feature value is greater than or equal to the threshold value Th (YES in S47), the detecting unit 17 determines that some motion is performed in that time section. Accordingly, in order to continue the processing after further shifting the time point t backward on the time axis, the detecting unit 17 sets the space parameter s to the initial value (s=0) (S48).

If the difference between the largest feature value and the smallest feature value obtained at two time points is not greater than or equal to the threshold value Th (NO in S47), the detecting unit 17 increments the space parameter s by one (+1) (S49). Note that for example, in S49, the period of time during which a difference between the largest feature value and the smallest feature value is less than the threshold value is set to one second. However, the process is not limited thereto. Subsequently, the detecting unit 17 determines whether the period of time corresponding to the space parameter s exceeds 2Δt (S50).

If the period of time does not exceed 2Δt (NO in S50) or if the processing proceeds from S48, the detecting unit 17 decrements the time t by one (−1) (S51). Thereafter, the processing returns to S46. That is, in S51, for example, the time of interest for processing is moved backward on the time axis (for example, −1 second). However, the process is not limited thereto.

However, if, in S50, the period of time corresponding to the space parameter s exceeds 2Δt (YES in S50), the detecting unit 17 outputs the section as a candidate section [t:tm] (S52). That is, in the process illustrated in FIG. 10, the detecting unit 17 detects a time section during which the user continuously performs some motion as a candidate section.

While the description above has been made with reference to a process in which a candidate section is detected based on the feature value of an image, the feature value is not limited to the feature value of an image. For example, the process can be similarly applied to detect a section even when the input signal is an audio signal.

Example of Section Detecting Process Performed by Detecting Unit

An example of a section detecting process performed by the detecting unit 17 is described next. Using the result of detection of a candidate section described above, the detecting unit 17 digitizes the similarity of the feature value in the candidate section to the template feature and extracts a portion having a high similarity as a section.

Figure 11:
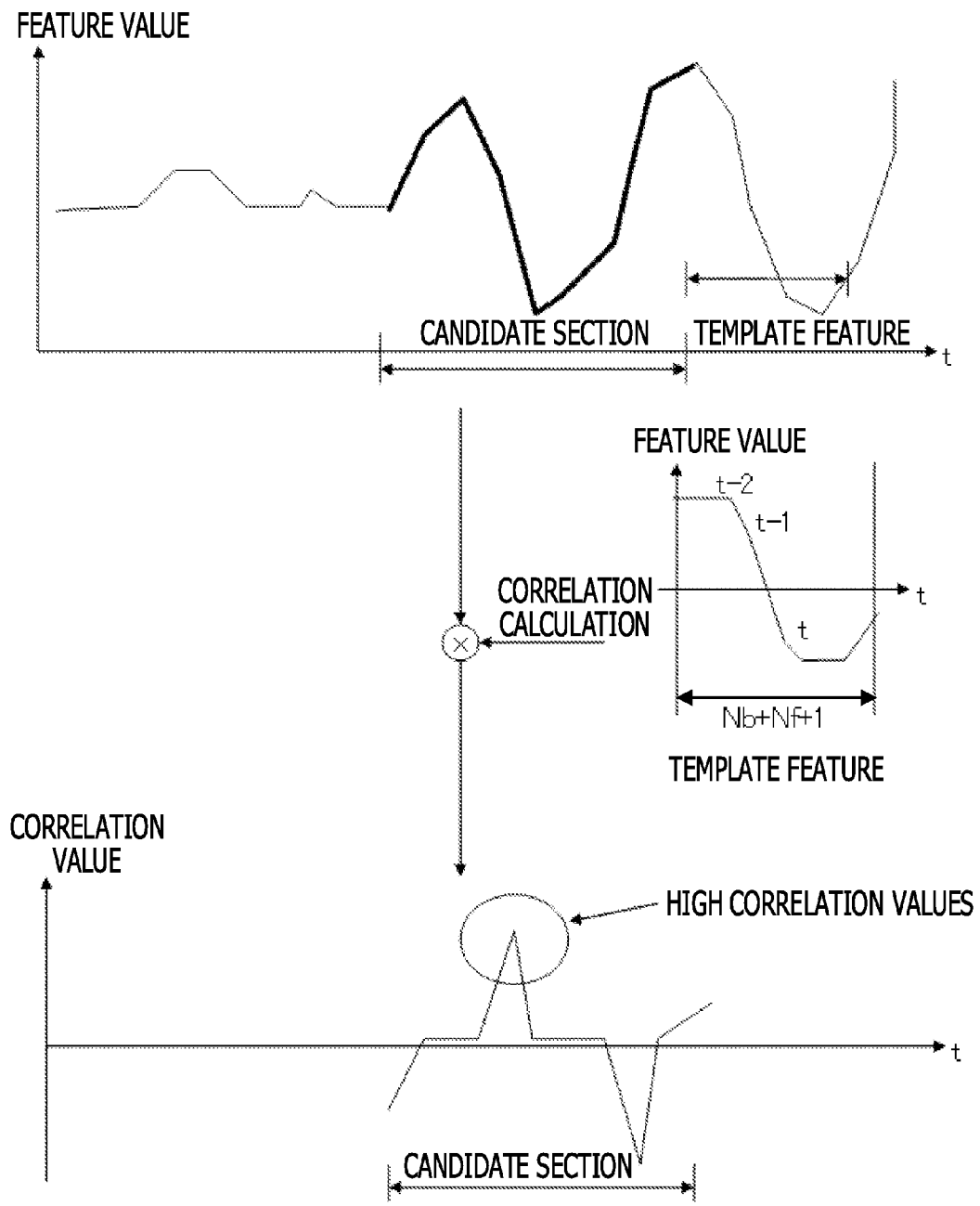
FIG. 11 illustrates an example of detection of a section performed by the detecting unit.
Figure 12:
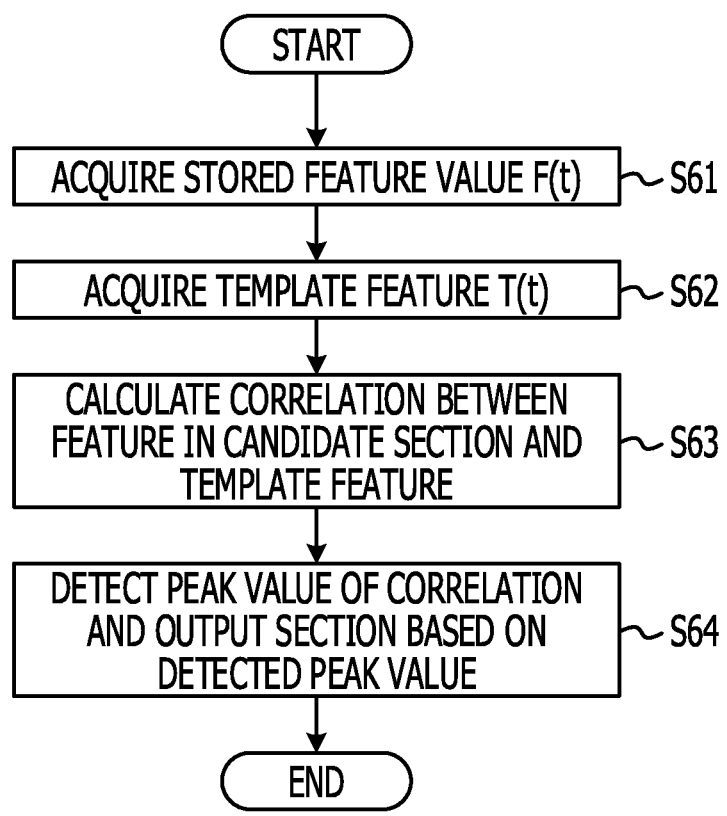
FIG. 12 is a flowchart of an example of a section detecting process performed by the detecting unit.

FIG. 11 illustrates an example of detection of a section performed by the detecting unit. FIG. 12 is a flowchart of an example of a section detecting process performed by the detecting unit.

The detecting unit 17 can calculate the similarity using, for example, a mutual correlation between the time series of the feature value in the candidate section and the template feature. However, the calculation is not limited thereto. More specifically, as illustrated in FIG. 11, the detecting unit 17 uses the section (Nb+Nf+1) corresponding to the template feature as a reference. The detecting unit 17 moves the time point of interest backward on the time axis and compares the time series of the feature value in a candidate section with the feature template. In this manner, the detecting unit 17 sequentially calculates a correlation between the two feature values. As a result, as illustrated in FIG. 11, the correlation for the candidate section can be obtained.

For example, as illustrated in FIG. 11, although a portion of the time series of the feature value of the candidate section having a high correlation value with the template feature is close to the feature value recognized by the recognition unit 16, the portion is not recognized as the predetermined operation. However, the input signals have a high similarity to each other. In addition, since a portion having a high similarity value appears, it is likely for the user to perform the predetermined input operation a plurality of times.

Accordingly, if the detecting unit 17 can detect one or more sections having a high correlation value, the detecting unit 17 changes the parameter (the recognition condition) using the parameter changing unit 19 so that the feature value in the section is recognized as a type of operation that is the same as the type of operation recognized from the template feature. In this manner, in the subsequent recognition processes, the recognition unit 16 can recognize a type of operation that was not previously recognized.

In the example illustrated in FIG. 12, the detecting unit 17 acquires a time series of a feature value F(t) illustrated in FIG. 9A (S61) and further acquires a template feature T(t) (S62). Subsequently, as illustrated in FIG. 11, the detecting unit 17 calculates a mutual correlation between the time series of the feature value in the candidate section and the template feature using, for example, a predetermined correlating equation and acquires a correlation value for the time t (S63). Thereafter, the detecting unit 17 detects a peak value of the correlation and outputs the section based on the detected peak value (S64).

Figure 13:
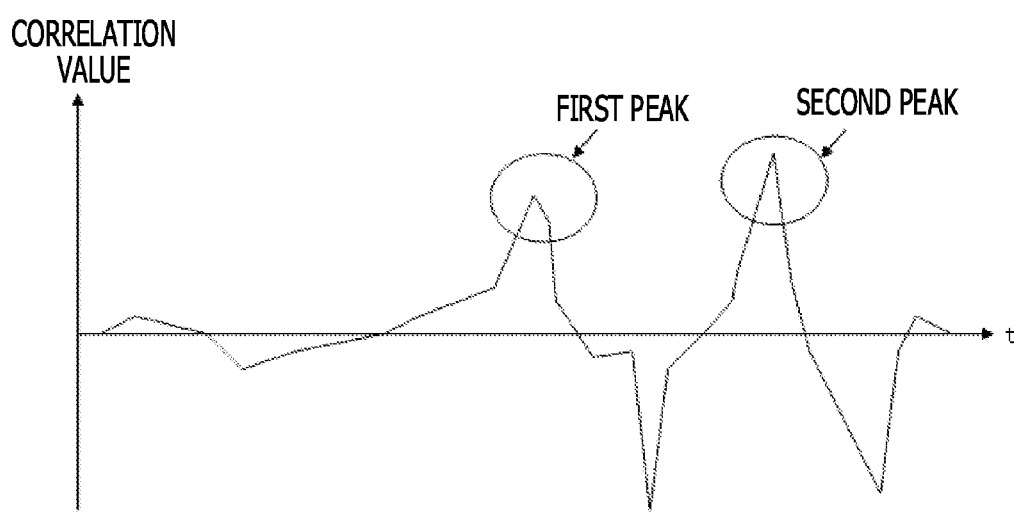
FIG. 13 illustrates an example of the result of a correlation.

FIG. 13 illustrates an example of the result of a correlation. An example illustrated in FIG. 13 indicates that the detecting unit 17 calculates the correlations in S63 in the above-described manner and detects a plurality of portions each having a high correlation value (a peak value) (two portions in this example).

As illustrated in FIG. 13, if a plurality of peaks of the correlation value appears in a relationship between the time t and the correlation value, the detecting unit 17 uses a time point at which the calculation of a correlation is started as a time point of interest and detects a plurality of peak values having a correlation that is higher than a predetermined threshold value and, subsequently, detects a section based on time points corresponding to the peak values. Note that a technique for detecting a section is not limited thereto. For example, the detecting unit 17 may detect, from among a plurality of peak values, the first or last peak value on the time axis. Alternatively, the detecting unit 17 may detect all of the peaks or a peak at which the correlation value is maximized. Still alternatively, the detecting unit 17 may detect a peak of the correlation value that is higher than or equal to a predetermined threshold value.

For example, if the detecting unit 17 detects the first peak of the correlation value on the time axis, the "first peak" illustrated in FIG. 13 is detected. It is highly likely that the first peak indicates a first input operation performed by the user. Accordingly, the parameter changing unit 19 changes the parameter so that the time series of the feature value corresponding to the first peak is recognized as a type of operation that is the same as the type of operation corresponding to the template feature. In this manner, the user can easily input a desired operation in the subsequent operations.

Alternatively, if the detecting unit 17 detects a peak at which the correlation value is maximized from the candidate sections, the "second peak" illustrated in FIG. 13 is detected. The second peak indicates a portion that is most similar to the template feature. Accordingly, the parameter changing unit 19 changes the parameter so that the time series of the feature value corresponding to the second peak is recognized as a type of operation that is the same as the type of operation corresponding to the template feature. In this manner, the parameter changing unit 19 does not suffer from misrecognition caused by changing the parameter too much.

According to the present exemplary embodiment, learning is performed using the feature value in a section obtained through the above-described process. The parameter changing unit 19 changes the parameter and uses the changed parameter in the subsequent recognition processes for an input signal. In this manner, an input signal that was not previously recognized can be recognized. Thus, when, for example, a predetermined operation is assigned to a large hand waving gesture in advance and if the user waves their hand a bit, the gesture is recognized as the same operation. Thus, the process corresponding to the operation can be performed.

Note that to avoid misrecognition caused by overexpanding the parameter, the range of the parameter to be changed by the parameter changing unit 19 may be limited.

Other Examples of Parameter Change

The above-described parameter change can be similarly applied even when the user input an audio signal. In the case of input of an audio signal, the amplitude information or the cepstrum information (for example, MFCC) regarding the audio signal can be extracted as a feature value. However, the feature value is not limited thereto.

Figure 14A:
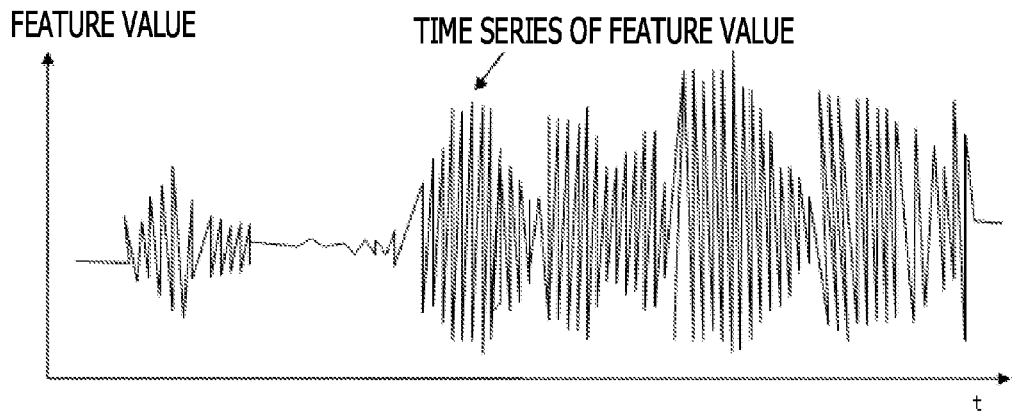
FIGS. 14A to 14C illustrate an example of detection of a candidate section for an audio signal.
Figure 14B:
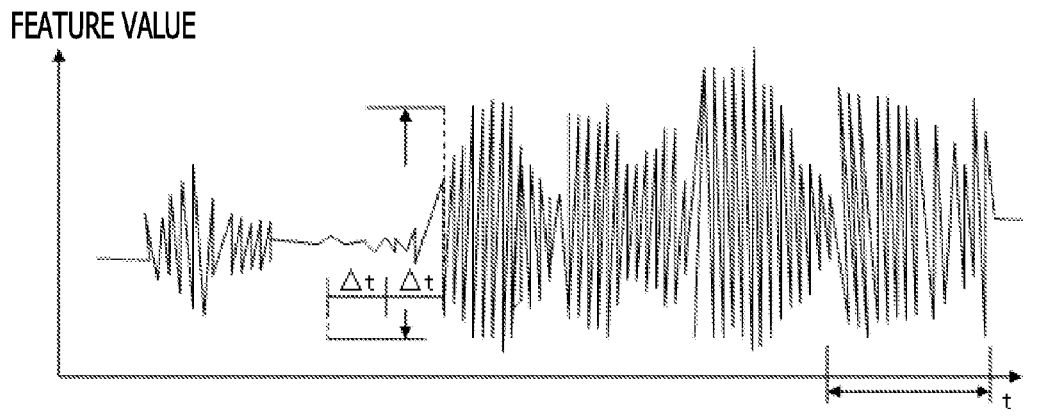
Figure 14C:
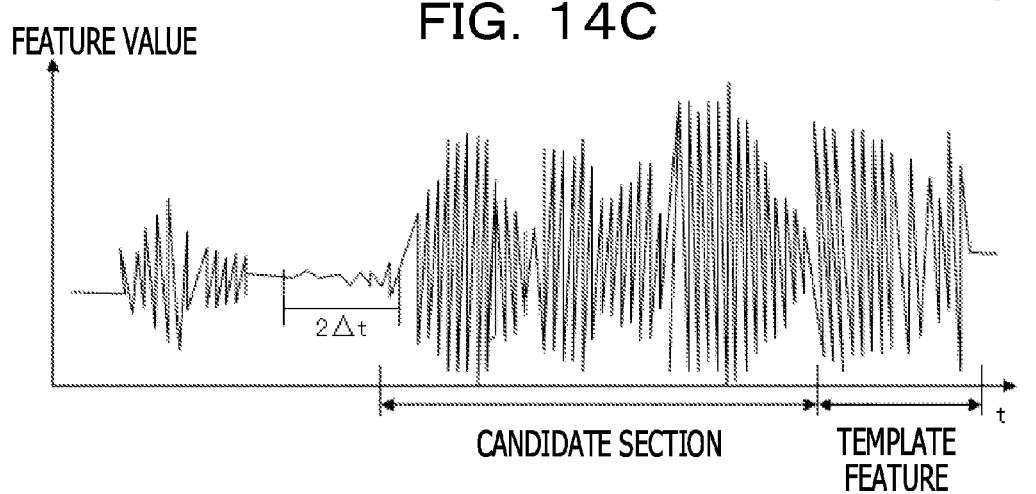

FIGS. 14A to 14C illustrate an example of detection of a candidate section for an audio signal. In the case of an audio signal, the recognition unit 16 acquires a time series of a feature value based on, for example, the amplitude, as illustrated in FIG. 14A. As illustrated in FIG. 14B, the detecting unit 17 extracts a section of the template feature and acquires a time at which, for example, the feature value is maximized and a time at which the feature value is minimized in a section defined by ±Δt from the time t prior to the start time of the detected section. The detecting unit 17 performs the above-described process while shifting the time t by a predetermined time interval. Thus, the detecting unit 17 acquires one or more time points.

Furthermore, by connecting sections for which a difference between the feature values at two times obtained in the above-described process is greater than or equal to the predetermined threshold value Th and the two time points are within a predetermined range (for example, 2Δt), the detecting unit 17 can detect an audio candidate section, as illustrated in FIG. 14C.

In addition, the detecting unit 17 compares the feature value in the candidate section with the template feature and detects a portion having a high correlation value (high similarity) with the section. The parameter changing unit 19 changes the parameter corresponding to the type of operation recognized from the template feature so that the feature value in the section detected by the detecting unit 17 is recognized as the type of operation recognized from the template feature. In this manner, the recognition unit 16 can recognize the type of operation performed by the user using the changed parameter and, thus, can recognize a type of operation that was not previously recognized.

In addition, the above-described parameter change can be similarly applied to the operation performed on, for example, a touch panel. For example, if a point of view of the user is shifted, the user may touch (or tap) a point shifted from a desired point. Accordingly, since no response is returned, the user touches a point near the previously touched point again. If no response is returned, a user generally touches the panel again and again while changing the touch point. Thus, finally, a correct point can be touched. In such a case, by using information regarding the touch position and the periodic information, a positional shift can be corrected. In this manner, the recognition condition can be changed (for example, the recognition condition can be eased).

When the above-described touch operation is performed, the feature value extraction unit 15 can extract, for example, time series coordinates of touch positions, the moving speed, and pressing forces exerted on the panel as a feature value. However, the feature value is not limited thereto. The extracted feature value is stored in the storage unit 13.

Figure 15:
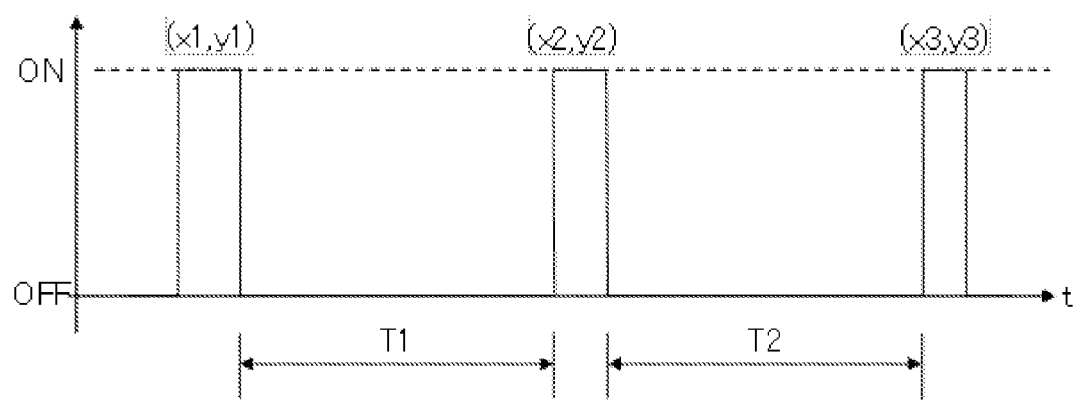
FIG. 15 illustrates an example of the coordinates of touch positions and the time intervals of the touch positions.

FIG. 15 illustrates an example of the coordinates of touch positions and the time intervals of the touches. More specifically, FIG. 15 illustrates the on/off modes, the touch intervals (T1, T2), and the coordinates of the positions ((x1, y1), (x2, y2), and (x3, y3)) serving as a feature value in a time series manner. The "on" mode indicates a mode in which the finger, for example, of the user touches the touch panel, and the "off" mode indicates a mode in which the finger of the user does not touch the touch panel.

For example, let $Th_1$ be a predetermined distance threshold value, and $Th_2$ be a predetermined time threshold value. Then, the detecting unit 17 detects a time point at which the following conditions are met:

$$(x1-x2)^2+(y1-y2)^2<Th_1,$$

$$(x2-x3)^2+(y2-y3)^2<Th_1, \text{ and}$$

$$|T1-T2|<Th_2.$$

In the example illustrated in FIG. 15, in touch 1 (x1, y1) and touch 2 (x2, y2), the user does not touch any button. In touch 3 (x3, y3), the user presses a particular button. In such a case, if the feature value in "on" mode of touch 3 is defined as the template feature, the detecting unit 17 can determine that the "on" modes of touches 1 and 2 are sections of a high correlation.

Accordingly, the parameter changing unit 19 applies an offset to the coordinates (x, y) of a touch position and changes the parameter so that each of touch 1 and touch 2 is recognized as an operation that is the same as the operation obtained from touch 3. In this manner, in the subsequent processes, the recognition unit 16 can recognize touches 1, 2, and 3 as the same operation. Thus, a problem of shifting of touch of an operation button caused by shifting of a point of view of the user can be solved.

Note that an example of the parameter for a touch panel is not limited thereto. For example, this process can be also applied to recognition of the operations, such as double tap, drag, flick, pinch-in, and pinch-out.

As described above, according to the present exemplary embodiment, a signal that was not previously recognized can be recognized. More specifically, according to the present exemplary embodiment, by, for a signal section that is not recognized, retrieving a section that is similar to a recognized signal section, performing a learning process, and changing the parameter, a signal that was not previously recognized can be recognized.

In this manner, when the user repeatedly performs similar gesture motions in order to cause a computer to recognize a particular operation and if one of the gesture motions is recognized by the computer, the computer can recognize a gesture motion that was not previously recognized can be recognized as the same operation in the subsequent recognition processes.

In addition, according to the present exemplary embodiment, by controlling the above-described learning process for each of the users using the identification process, the parameter suitable for each of the users can be set. Furthermore, according to the present exemplary embodiment, by changing back the changed parameter to the original parameter at a predetermined point in time, misrecognition caused by changing the parameter too much does not occur.

Furthermore, according to the present exemplary embodiment, by using, for example, a signal in an extracted candidate section, information as to what input mistake (wrong motion) the user has made can be obtained. Therefore, according to the present exemplary embodiment, development of a learning phase and a recognition process can be improved by using the obtained information regarding input mistakes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A signal processing device, comprising:
a memory; and
a processor coupled to the memory and configured to:
receive time series information related to an operation of a user from a camera, extract first time series information from the time series information, determine whether the first time series information is recognized as a particular type of operation, based on a recognition condition, extract second time series information prior to the first time series information from the time series information when the first time series information is recognized as the particular type of operation according to the determining, the second time series information being similar to the first time series information, change the recognition condition so that the second time series information is recognized as the particular type of operation, and execute a recognition processing to another time series information based on the changed recognition condition, when the another time series information is received from the camera.

2. The signal processing device according to claim 1, wherein the processor is configured to extract the second time series information when a correlation between the first time series information and the second time series information is higher than or equal to a given threshold.

3. The signal processing device according to claim 1, wherein the processor is configured to:

detect one or more candidate sections from the second time series information based on a similarity to the first time series information, and select a section including the second time series information from among the detected one or more candidate sections.

4. The signal processing device according to claim 3, wherein the processor is configured to detect the one or more candidate sections based on at least one of a detection order on a time axis and a given number with respect to the similarity.

5. The signal processing device according to claim 4, wherein the processor is configured to detect the one or more candidate sections including one of a candidate section first detected on the time axis or and a candidate section last detected on the time axis.

6. The signal processing device according to claim 1, wherein the processor is configured to:

set the recognition condition for a plurality of users, change the recognition condition set for the user when the user is identified, and change a common parameter set for the plurality of users when the user unidentified.

7. The signal processing device according to claim 1, wherein the processor is configured to restore the changed recognition condition to the recognition condition before the change, when at least one of a given period of time has elapsed, a given action has been completed, and an instruction from a user has been provided.

8. The signal processing device according to claim 1, wherein the processor is configured to change the recognition condition when the second time series information has not been recognized using the recognition condition before the change.

9. The signal processing device according to claim 1, wherein the second time series information is detected when the second time series information is determined to be within a range of the recognition condition for recognizing the first time series information.

10. The signal processing device according to claim 1, wherein the second time series information is used to recognize a subsequent input signal as satisfying the recognition condition.

11. A signal processing method, comprising:

receiving time series information related to an operation of a user from a camera;

extracting first time series information from the time series information;

determining whether the first time series information is recognized as a particular type of operation, based on a recognition condition;

extracting second time series information prior to the first time series information from the time series information when the first time series information is recognized as the particular type of operation according to the determining, the second time series information being similar to the first time series information;

changing the recognition condition so that the second time information series is recognized as the particular type of operation; and executing a recognition processing to another time series information based on the changed recognition condition, when the another time series information is received from the camera.

12. The signal processing method according to claim 11, wherein the second time series information is extracted when a correlation between the first time series information and the second time series information is higher than or equal to a given threshold.

13. The signal processing method according to claim 11, further comprising:

detecting one or more candidate sections from the second time series information based on a similarity to the first time series information; and selecting a section including the second time series information from among the detected one or more candidate sections.

14. The signal processing method according to claim 13, further comprising:

detecting the one or more candidate sections based on at least one of a detection order on a time axis and a given number with respect to the similarity.

15. The signal processing method according to claim 14, further comprising:

detecting the one or more candidate sections including one of a candidate section first detected on the time axis or and a candidate section last detected on the time axis.

16. The signal processing method according to claim 11, further comprising:

setting the recognition condition for a plurality of users;

changing the recognition condition set for the user when the user is identified, and changing a common parameter set for the plurality of users when the user is unidentified.

17. The signal processing method according to claim 11, further comprising:

restoring the changed recognition condition to the recognition condition before changing, when at least one condition is satisfied among conditions that a given period of time has elapsed, that a given action has been completed, and that an instruction from the user has been provided.

18. A non-transitory computer-readable storage medium storing a signal processing program that causes a computer to execute a process, the process comprising:
   receiving time series information related to an operation of a user from a camera;
   extracting first time series information from the time series information;
   determining whether the first time series information is recognized as a particular type of operation, based on a recognition condition;
   extracting second time series information prior to the first time series information from the time series information when the first time series information is recognized as the particular type of operation according to the determining, the second time series information being similar to the first time series information;
   changing the recognition condition so that the second time series information is recognized as the particular type of operation; and
   executing a recognition processing to another time series information based on the changed recognition condition, when the another time series information is received from the camera.

19. The signal processing device according to claim 1, wherein the processor is further configured to:
   determine whether the recognition processing is to be completed, and
   initialize the recognition condition before completing the recognition processing when determining that the recognition processing is to be completed.

* * * * *